United States Patent
Tsai et al.

[11] Patent Number: 6,019,664
[45] Date of Patent: Feb. 1, 2000

[54] HEIGHT GAUGE DEVICE FOR WAFER

[75] Inventors: Pei-Wei Tsai; Hua-Jen Tseng, both of ChuPei; Chun-Chieh Lee, Hsinchu Hsien; Dong-Tay Tsai, KaoShiung, all of Taiwan

[73] Assignee: Mosel Vitelic Inc., Hsinchu, Taiwan

[21] Appl. No.: 09/281,944

[22] Filed: Mar. 31, 1999

[30] Foreign Application Priority Data

Oct. 7, 1998 [TW] Taiwan ................................. 87116584

[51] Int. Cl.⁷ ..................................................... B24B 49/00
[52] U.S. Cl. ............................. 451/11; 33/501.04; 33/832
[58] Field of Search .............................. 451/11, 486, 485, 451/484; 33/501.04, 501.02, 501.03, 551, 555, 832, 834; 73/865.9

[56] References Cited

U.S. PATENT DOCUMENTS

| | | | |
|---|---|---|---|
| 2,573,075 | 10/1951 | Watson | 33/501.04 |
| 3,119,187 | 1/1964 | Meyer | 33/501.04 |
| 5,239,763 | 8/1993 | Kulp | 33/832 |

*Primary Examiner*—Rodney Butler
*Attorney, Agent, or Firm*—Bacon & Thomas

[57] ABSTRACT

A height gauge device for wafer, which is mounted under a cooling water pipe of a back-grinding machine; the device comprises a height gauge box, a measuring rod, a L-shaped linking rod and a resilient member; a signal sensor is mounted inside the height gauge box for measuring the height of a wafer; both ends of the measuring rod are connected with the signal sensor and the L-shaped linking rod respectively; the L-shaped linking rod is mounted with a probing needle; the resilient member is mounted between the L-shaped linking and the cooling water pipe; in height gauging operation, the probing needle on the L-shaped linking needle should be raised first so as to put a wafer under the probing needle, and to have the probing needle pressed against the wafer by means of the resilient force of the resilient member; consequently, the resilient member is subject to elastic fatigue or break; the resilient member of the height gauge device can be replaced directly without opening the height box so as to save time and maintenance cost.

6 Claims, 4 Drawing Sheets

HEIGHT GAUGE DEVICE FOR WAFER

FIELD OF THE INVENTION

This invention relates to a height gauge device for wafer, and particularly to a height gauge device of a back-grinding machine.

BACKGROUND OF THE INVENTION

The back-grinding machine is a machine to grind the back side of a wafer for obtaining global planarization. The planarization of a wafer back has a great influence on the yield of wafer; a wafer usually includes a front side and a back side; if the back side is not planarized, a wafer can not achieve global planarization even though the front side has been planarized. The yield of wafer is reduced because the back side is not planarized. For this reason, it is necessary for the grind of the back side of a wafer in semi-conductor manufacturing process.

Referring to FIG. 1, it shows a height gauge device 1 of a conventional back-grinding machine, which is used to gauge the height of a wafer 2 so as to have the consumption of the wafer, limited within an extent upon the wafer back 21 being ground with the back-grinding machine. The back-grinding machine includes a cooling water pipe 3 for supplying cooling water to the height gauge device 1 during grinding operation. The height gauge device 1 is mounted under the cooling water pipe 3, and the device comprises a height gauge box 12, a measuring rod 14, a L-shaped linking rod 16, a cylinder 18 and a spring 19.

The height gauge box 12 is substantially a container, which is filled with an oil substance 4 and a signal sensor 123.

The measuring rod 14 includes a measuring end 141, a fulcrum 142 and a sensing end 143; the measuring end 141 is in contact with the signal sensor 123 of the height gauge box 12; the fulcrum 142 is mounted inside the height gauge box 12. The measuring end 141 extends out of the height gauge box 12. The measuring rod 14 is connected with the height gauge box 12 by means of a spring 19.

The L-shaped linking rod 16 includes a first end 161, a second end 162 and an elbow portion 163; the first end 161 is connected with the measuring end 141 of the measuring rod 14; the second end 162 is mounted with a probing needle 164.

The cylinder 18 is mounted under the height gauge box 12, and the first front thereof has a pushing bar 181, which is opposite to the elbow portion 163 of the L-shaped linking rod 16.

The operation procedures of the conventional method to gauge the height of a wafer 2 are as follows (a) To let the pushing bar 181 on the cylinder 18 push the elbow portion 163 of the L-shaped linking rod 16 so as to have the probing needle 164 on the second end 162 of the rod 16 raised (as shown in FIG. 2).

(b) Put a wafer 2 under the probing needle 164 and then remove the pushing force of the pushing bar 181.

(c) By means of the resilience of the spring 19 between the height gauge box 12 and the measuring rod 14, the probing needle 164 will move downwards to contact with the wafer 2.

(d) During the wafer back 21 being ground with the back-grinding machine, the probing needle 164 of the height gauge device will sense the height variation of the wafer 2; through the L-shaped linking rod 16 and the measuring rod 14, the signal sensor 123 inside the height gauge box 12 will generate a corresponding and varied signal, which will measure and calculate the height of the wafer 2.

However, the spring 19 between the height gauge box 12 and the measuring rod 14 is subject to elastic fatigue or break after the height gauge device 1 being operated for a given period of time. The function of the spring 19 is that as soon as the pushing force of the pushing bar 181 on the cylinder 18 is removed, the probing needle 164 will press down on the wafer 2. In the event of the probing needle 164 moving down too slowly or unable to move down, the operation of the back-grinding machine will be interrupted; in that case, the spring 19 suffered from elastic fatigue or break must be replaced.

When the spring 19 in the conventional height gauge device 1 is replaced, the height gauge box 12 must be opened first; unfortunately, once the height gauge box 12 is opened, the oil substause 4 therein would leak out or be polluted. The quantity and purity of the oil substanse 4 in the height gauge box 12 will definitely affect the accuracy of the height gauge device 1; in other words, after the spring 19 in the height gague box 12 is replaced, the measuring result of the wafer 2 would have a tolerance more or less. In that case, the whole height gauge device 1 must be replaced, and then more money and time will cost.

SUMMARY OF THE INVENTION

The prime object of the persent invention is to provide a height gauge device for wafer, in which the spring upon becoming elastic fatigue or broken can be replaced directly without opening the height gauge box so as to prevent the oil substance inside the height gauge box from leaking out or being polluted. The present invention not only can save time for replacing the spring, but also can maintain the accuracy of the height gauge device.

The height gauge device of the present invention is mounted under the cooling water pipe of the back-grinding machine, an the device comprises a height gauge box, a measuring rod, a L-shaped linking rod, a cylinder and a resilient member.

The height gague box is a container, which is filled with an oil substance and a signal sensor. The measuring rod includes a measuring end, a fulcrum and a sensing end; the fulcrum is mounted inside the height gauge box; the sensing end is connecting with the signal sensor inside the height gauge box; the measuring end extends out of the height gauge box. The L-shpaed linking rod includes a first end, a second end and an elbow portion; the first end is connected with the measuring end of the measuring rod; the second end is mounted with a probing needle. The cylinder is mounted under the height gauge box, and the front end of the cylinder is furnished with a pushing bar, which is exacting opposite to the elbow portion of the L-shaped linking rod. The resilient member is mounted between the first end of the L-shaped linking rod and the cooling water pipe.

In the present invention, a resilient member is used for replacing the spring mounted inside the conventional height gauge box, and it is mounted between the cooling water pipe and the first end of the L-shaped linking rod. In case of the resilient member suffering from elastic fatigue or break after being used for a given period of time, it can be replaced directly without opening the height gauge box; in that case, the oil substance inside the height gauge box would not leak out, or not be polluted; in other words, the present invention can save and reduce the maintenance cost and time of the height gauge device.

In order to facilitate examination on the objects, features and effective functions of the present invention, a detailed description thereof is given in the following paragraphs accomplished with drawings.

DETAILED DESCRIPTION

A back-grinding machine is usually used for grinding the wafer back 21 for obtaining global planarization. In order to prevent the wafer back 21 from consuming too much, the height of a wafer 2 must be measured upon the wafer back 21 being ground simultaneously. In order to cool the heat of the height gauge device 5 during grinding, the back-grinding machine is furnished with a cooling water pipe 3 to supply a cooling water upon grinding operation.

Figure 1:
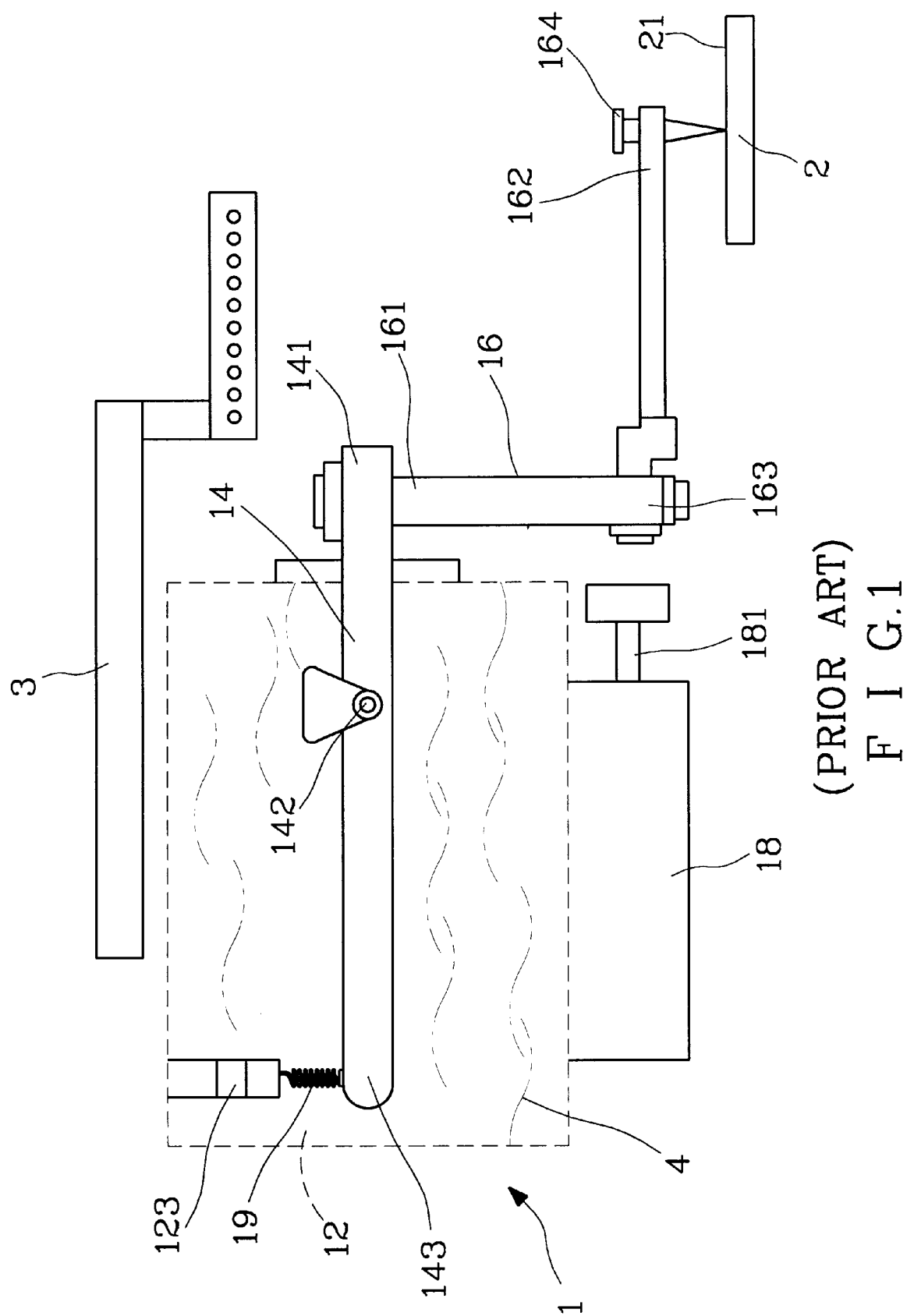
FIG. 1 is a schematic view of a conventional height gauge device for wafer.
Figure 2:
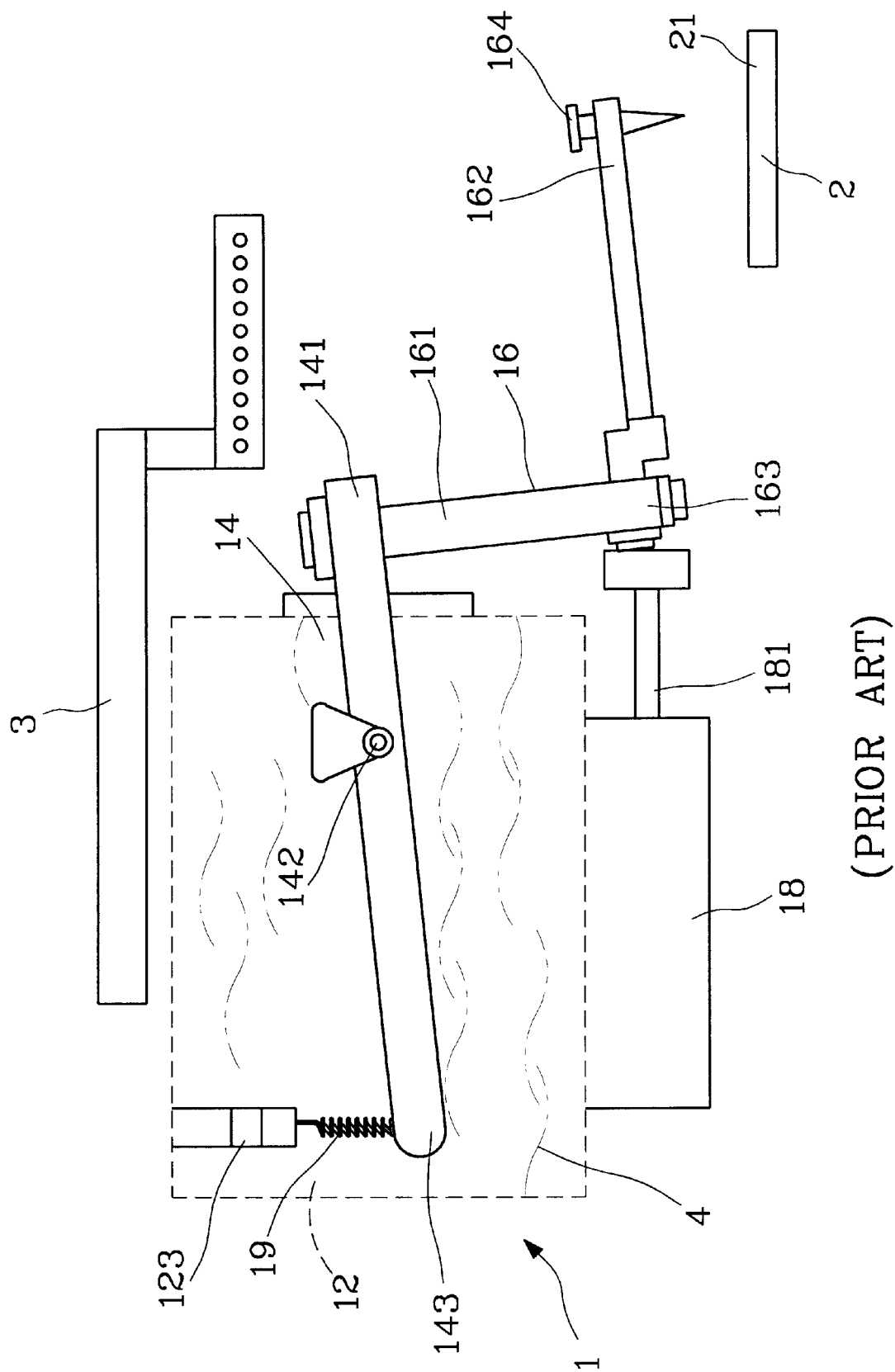
FIG. 2 is a schematic view of the conventinal height gague device, showing the pushing bar of the cylinder to apply force to the L-shaped linking rod thereof.
Figure 3:
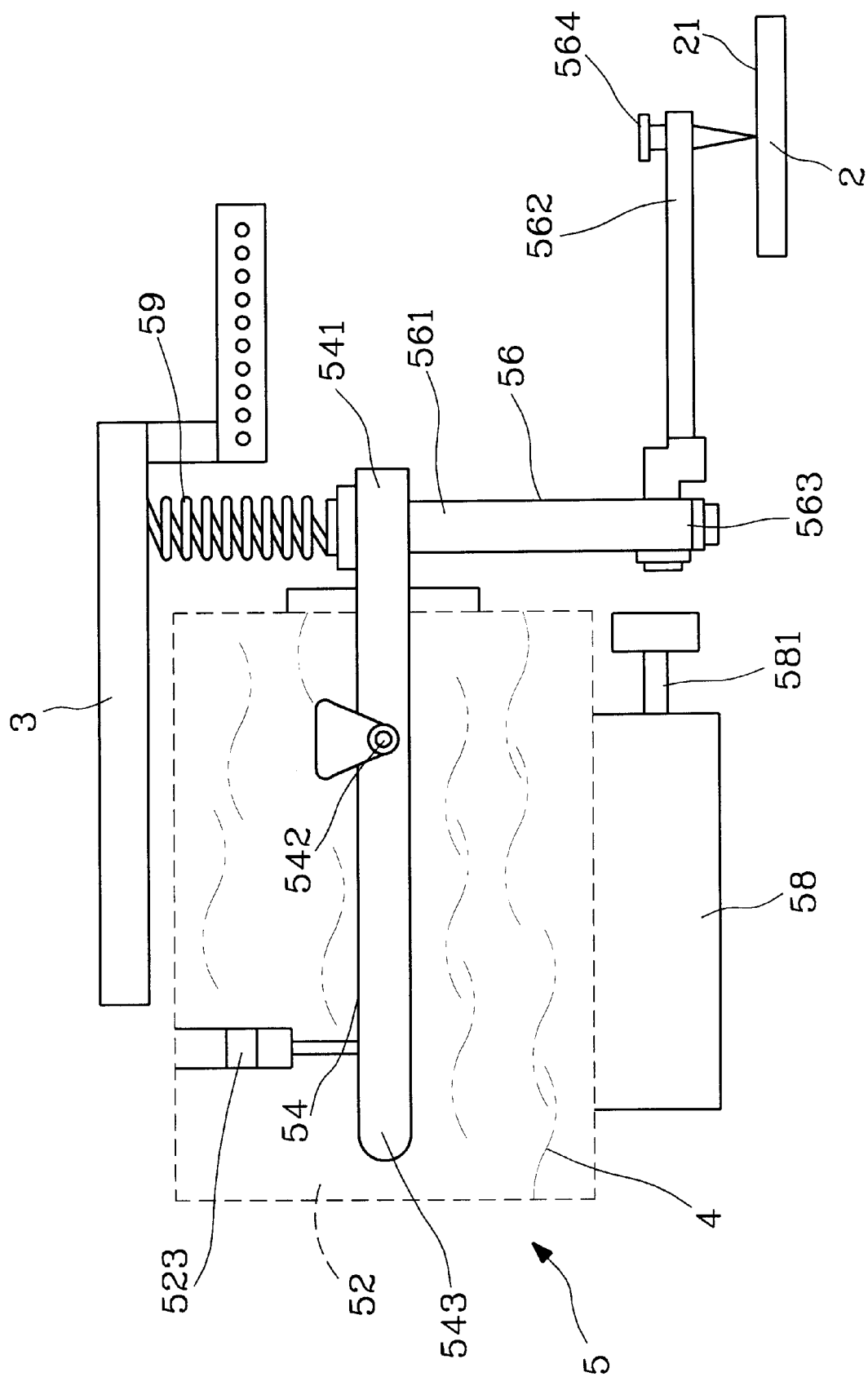
FIG. 3 is a schematic view of a height gague device for wafer according to the present invention.

Referring to FIG. 3, the height gauge device 5 for wafer according to the present invention is mounted below the cooling water pipe 3 of the back-grinding machine; the device comprises a height gauge box 52, a measuring rod 54, a L-shaped linking rod 56, a cylinder 58 and a resilient member 59.

The height gauge box 52 is substantially a container, which is loaded fully with an oil substance 4, and furnished with a signal sensor 523.

The measuring rod 54 includes a measuring end 54, a fulcrum 542 and a sensing end 543. The fulcrum 542 is furnished in the height gauge box 52. The sensing end 543 is connected with the signal sensor 523; the measuring end 541 extends out of the height gauge box 52; the mesuring rod 54 is hinged on the fulcrum 542.

The L-shaped linking rod 56 includes a first end 561, a second end 562 and an elbow portion 536; the first end 561 is connected with the measuring end 541 of the measuring end 54. The second end 562 is mounted with a probing needle 564 which has a diamond head.

The cylinder 58 is mounted under the height gauge box 52, and the front end of the cylinder 58 is mounted with a pushing bar 581. The pushing bar 581 is controlled with the cylinder 58 to move back and forth straight, and the pushing bar 581 is exactly opposite to the elbow portion 563 of the L-shaped linking rod 56.

The resilient member 59 is a spring connected between the first end 561 of the L-shaped linking rod 56 and the cooling water pipe 3. The resilient member 59 is 24 mm in length, 9 mm of outer diameter and 7 mm of inner diameter; the function thereof is to enable the probing needle 564 to press the wafer 2 downwards rapidly.

Figure 4:
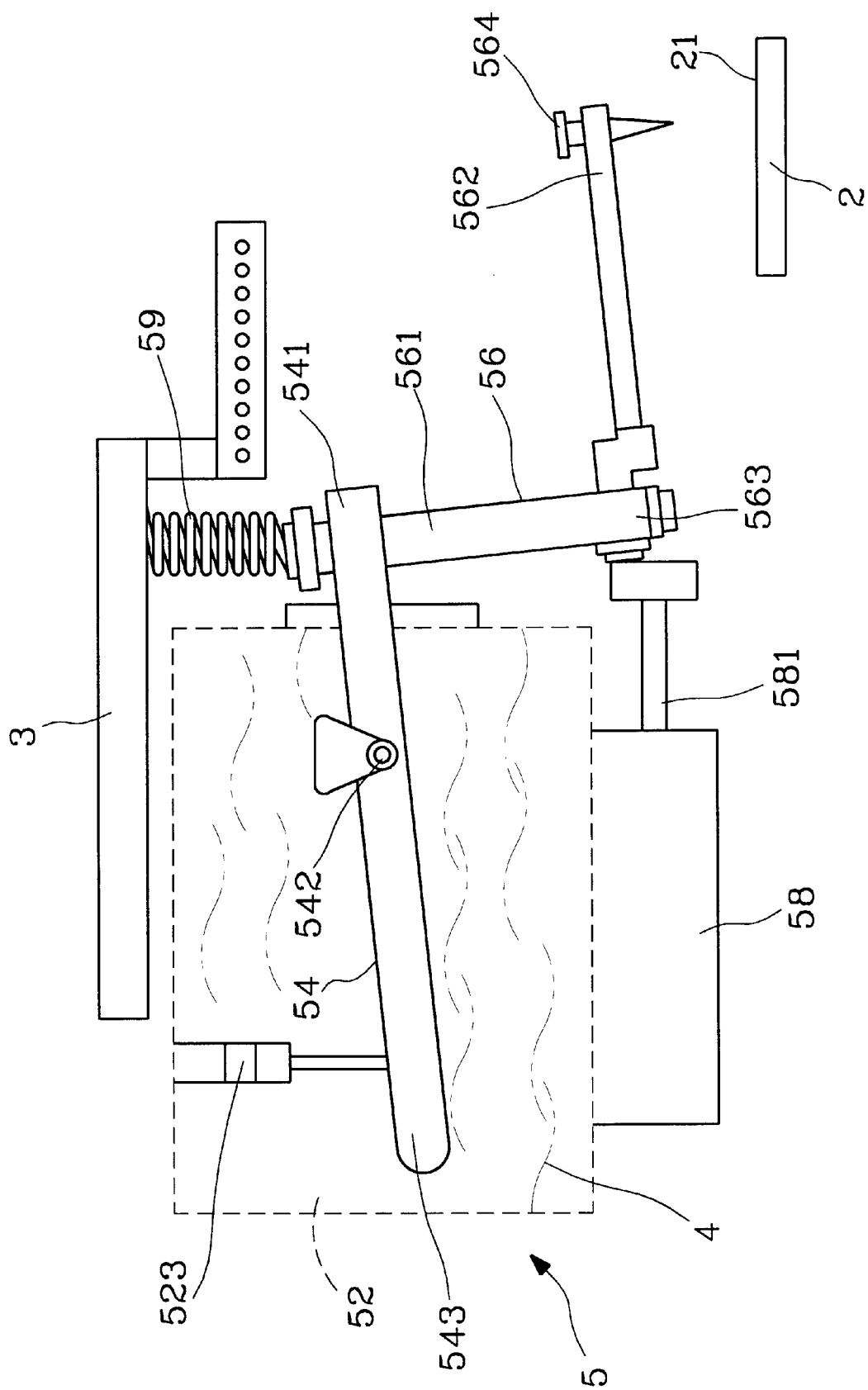
FIG. 4 is a schematic view of the height gague device for wafer according to the present invention, showing the pushing bar of the cylinder to apply force to the L-shaped linking rod thereof.

In measuring a wafer 2 by using the height gauge device 5 according to the present invention, the elbow portion 563 of the L-shaped linking rod 56 will be pushed with the pushing bar 581 in front end of the cylinder 58 so as to have the measuring rod 54 and L-shaped linking rod 56 turned around the fulcrum 542, and to cause the probing needle 564 to move upwards, and to have the resilient member 59 compressed (as shown in FIG. 4).

Put a wafer 2 under the probing needle 564 and remove the pushing force of the pushing bar 581; as a result of the resilient force of the resilient member 59, the probing needle 564 will press down to contact with the wafer 2; then, the wafer back 21 will be ground with a back-grinding machine, and simultaneously the cooling water pipe 3 will be used to cool the height gauge device 5.

During the height of the wafer 2 being reduced as a result of grinding with the back-grinding machine, the probing needle 564 on the second end 562 of the L-shaped linking rod 56 will sense the height variation of the wafer 2, and almost simultaneously a varied signal will be shown on the signal sonsor 523 in the height gauge box 52 through the L-shaped linking rod 56 and the measuring rod 54, and then the height of the wafer 2 will be calculated.

The height gauge device 5 of the present invention has more advantages than the conventional device of the kind. In the present invention, the resilient member 59 moutned between the first end 561 of the L-shaped linking rod 56 and the cooling water pipe 3 is used to replace the spring 19 mounted between the height gauge box 12 and the measuring rod 14 of the conventional device. Both the resilient member 59 and the spring 19 have the same function and elastic constant; as soon as the pressure of the pushing bar 581 is removed, the probing needle 564 will move downwards to contact and presst the wafer 2 immeidately.

Since the resilient member 59 is mounted outside the height gauge box 52, it can be replaced easily and quickly in case that the resilient member 59 suffers from elastic fatigue or break after using a given period of time, such as the probing needle 564 unable to move down or to move down slowly; in that case, the resilient member 59 can be replaced quickly without taking a long time so as to reduce repair cost; moreover, the resilient member 59 can be replaced without opening the height gauge box 52 so as to avoid the oil substance in the box 52 from leaking out or being polluted, i.e., the accuracy of wafer measuring would not be affected.

Almost all equipment used in semi-conductor factories is rather experience. The present invention after practical experiment is able to overcome the drawbacks of the conventional height gauge device during operation for wafer, and it is deemed a great invention in the semi-conductor industry. Since the resilient member 59 is mounted between the L-shaped linking rod 56 and the cooling water pipe 3, the design of the height gauge device 1 will not be affected at all. The manufacturer of a semi-conductor equipment can directly make such device according to the present invention; in other words, a semi-conductor manufacturer can simply repair the conventional height gauge device 1 by replacing the spring 19 failed to operate with a resilient member 59 to be mounted between the L-shaped linking rod 56 and the cooling water pipe 3 without replacing the whole device, and then a lot of maintenance expenses and cost can be saved.

It is understood that the aforesaid description is merely a preferred embodiment of the present invention, and it does not follow that the present invention is limited with the embodiment. Any person skilled in the art to make any modification thereto in accordance with the spirit of the present invention is deemed within the scope of the claims of the invention; therefore, the present inventinon will be protected under the claims in the following paragraphs.

What is claimed is:

1. A height gauge device used for a wafer back-grinding machine, and said back-grinding machine including a cooling water pipe; said height gauge device mounted under said cooling water pipe and comprising:

a height gauge box filled fully with an oil substance and including a signal sensor;

a measuring rod including a measuring end, a fulcrum and a sensing end; said falcrum mounted in said height gauge box; said sensing end and said signal sensor being connected together, and said measuring end extended out of said height gauge box;

a L-shaped linking rod including a first end, a second end and an elbow portion; said first end connected with said measuring end, and said second end mounted with a probing needle;

a cylinder mounted under said height gauge box, and front end of said cylinder having a pushing bar being opposite to said elbow portion of said L-shaped linking rod; and a resilient member connected between said first end of said L-shaped linking rod and said cooling water pipe.

2. A height gauge device as claimed in claim 1, wherein said probing needle on said second end of said L-shaped linking rod has a diamond head.

3. A height gauge device as claimed in claim 1, wherein said resilient member is a spring.

4. A height gauge device as claimed in claim 1, wherein said resilient member is 24 mm in length.

5. A height gauge device as claimed in claim 1, wherein said resilient member has an outer diameter of 9 mm.

6. A height gauge device as claimed in claim 1, wherein said resilient member has an inner diameter of 7 mm.

* * * * *